US007668790B2

(12) United States Patent
Barbu et al.

(10) Patent No.: US 7,668,790 B2
(45) Date of Patent: Feb. 23, 2010

(54) SYSTEM AND METHOD FOR FUSING DATA FROM DIFFERENT INFORMATION SOURCES WITH SHARED-SAMPLING DISTRIBUTION BASED BOOSTING

(75) Inventors: Costin Barbu, Hattiesburg, MS (US); Maura C Lohrenz, Pearl River, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 346 days.

(21) Appl. No.: 11/534,697

(22) Filed: Sep. 25, 2006

(65) Prior Publication Data

US 2008/0027887 A1 Jan. 31, 2008

Related U.S. Application Data

(60) Provisional application No. 60/820,527, filed on Jul. 27, 2006.

(51) Int. Cl.
*G06N 3/08* (2006.01)
(52) U.S. Cl. ........................................... 706/25
(58) Field of Classification Search .................... 706/25
See application file for complete search history.

(56) References Cited

U.S. PATENT DOCUMENTS 7,099,505 B2 * 8/2006 Li et al. ..................... 382/159
2004/0066966 A1 * 4/2004 Schneiderman ............. 382/159

OTHER PUBLICATIONS

Freund, Y. and Schapire, R. "A Short Introduction to Boosting", J. JSAI 14(5), 1999, pp. 771-778.*
Bartu et al. "Classifier Fusion Using Shared Sampling Distribution for Boosting", 5th ICDM, 2005.*
Kuncheva, L. I., "A Theoretical Study on Six Classifier Fusion Strategies", IEEE Transactions on Pattern Analysis and Machine Intelligence, vol. 24, No. 2, Feb. 2002, p. 281-286.
Lanckriet, G. R. G., "Learning the Kernel Matrix with Semidefinite Programming", Journal of Machine Learning Research, vol. 5 (Jan. 2004), p. 27-72.
Barbu, C., "Classifier Fusion Using Shared Sampling Distribution for Boosting", Proceedings of the Fifth IEEE International Conference on Data Mining, (ICDM'05), p. 34-41, Nov. 2005.

(Continued)

*Primary Examiner*—David R Vincent
*Assistant Examiner*—Li-Wu Chang
(74) *Attorney, Agent, or Firm*—John J Karasek; Sally A Ferrett (57) ABSTRACT

A boosting—based method and system for fusing a set of classifiers that performs classification using weak learners trained on different views of the training data. The final ensemble contains learners that are trained on examples sampled with a shared sampling distribution. The combination weights for the final weighting rule are obtained at each iteration based on the lowest training error among the views. Weights are updated in each iteration based on the lowest training error among all views at that iteration to form the shared sampling distribution used at the next iteration. In each iteration, a weak learner is selected from the pool of weak learners trained on disjoint views based on the lowest training error among all views, resulting in a lower training and generalization error bound of the final hypothesis.

18 Claims, 13 Drawing Sheets

OTHER PUBLICATIONS

Barbu, C,. "Boosting in Classifier Fusion vs. Fusing Boosted Classifiers", Proceedings of IEEE International Conference on Information Reuse and Integration, p. 332-337.

Barbu, C., "An Ensemble approach to Robust Biometrics Fusion", Proceedings of the 2006 Conference on computer Vision and Pattern Recognition Workshop, (CVPRW'06), Jun. 2006, p. 56-63.

Kim, S. W., "On Using Prototype Reduction Schemes and Classifier Fusion Strategies to Optimize Kernel-Based Nonlinear Subspace Methods", IEEE Transactions on Pattern Analysis and Machine Intelligence, vol. 27, No. 3, Mar. 2005, p. 455-460.

Xu, L., "Methods of Combining Multiple Classifiers and Their Applications to Handwriting Recognition", IEEE Transactions on Systems, Man, and Cybernetics, vol. 22, No. 3, May/Jun. 1992, p. 418-435.

Phillips, F. J., "The Feret Evaluation Methodology for Face-Recognition Algorithms", IEEE Transactions on Pattern Analysis and Machine Intelligence, vol. 22, No. 10, Oct. 2000, p. 1090-1104.

Wolpert, D. H., "Stacked Generalization", Neural Networks, vol. 5, pp. 241-259, 1992.

Schapire, RE. E., "Boosting the Margin: A New Explanation for the Effectiveness of Voting Methods", The Annals of Statistics, vol. 26, Issue 5, 1998, p. 1651-1686.

Rao, N. S. V., "On Fusers the Perform Better Than Best Sensor", IEEE Transactions on Pattern Analysis and Machine Intelligence, vol. 23, No. 8, Aug. 2001, p. 904-909.

Schapire, R. E., "Improved Boosting Algorithms Using confidence-rated Predictions", Machine Learning, vol. 37, p. 297-336 (1999).

Lanckriet, G. R. G., "Kernel-Based Data Fusion and Its Application to Protein Function Prediction in Yeast", Pacific Symposium on Biocomputing, vol. 9, p. 300-311, 2004.

Freund, Y., "A Short Introduction to Boosting", Journal of Japanese Society for Artificial Intelligence, vol. 14, Issue 5, p. 771-780, Sep. 1999.

Schapire, R. E., "The Boosting approach to Machine Learning an Overview", Nonlinear Estimation and Classification, Springer, 2003, p. 1-23.

Breiman, L., "Arcing Classifiers", The Annals of Statistic, vol. 26, No. 3, (Jun. 1998), pp. 801-824.

Freund, Y., "A Decision-Theoretic Generalization of On-Line Learning And an Application to Boosting", Journal of Computer and System Sciences, vol. 55, p. 119-139 (1997).

Fan, W., "Is random model better? On its accuracy and efficiency", Proceedings of the Third IEEE International Conference on Data Mining (ICDM'03), p. 51-58, Nov. 2003.

Hashem, S., "Optimal Linear Combinations of Neural Networks", Neural Networks, vol. 10, 4, p. 599-614m 1997.

Kuncheva, L. I., "Is Independence Good for combining Classifiers?", Proceedings of the 15th International Conference on Pattern Recognition, vol. 2, p. 168-171, Sep. 2000.

Kuncheva, L., "Decision templates for multiple classifier fusion: an experimental comparison", 0031-3203/00 Pattern Recognition, vol. 34, p. 299-314, (2001).

Kittler, J., "On Combining Classifiers", IEEE Transactions on Pattern Analysis and Machine Intelligence, vol. 20, No. 3, Mar. 1998, p. 226-239.

Kittler, J., "A Framework for Classifier Fusion: Is It Still Needed?" Lecture Notes in Computer Science, 1876, p. 45-56, 2000.

* cited by examiner

TABLE II: RESULTS FOR THE DATASET I

| METHOD USED | $A_R$ | $A_G$ | $A_B$ | FUSION ACCURACY | STATISTICAL SIGNIFICANCE† |
|---|---|---|---|---|---|
| STACKING | 0.79 | 0.80 | 0.81 | 0.82 | YES |
| SVM-MV | 0.79 | 0.80 | 0.81 | 0.81 | YES |
| SDP/SVM | GAUSS | GAUSS | GAUSS | 0.78 | YES |
| BSSD | 0.57 | 0.60 | 0.65 | 0.88 | |

TABLE III: RESULTS FOR THE DATASET II

| METHOD USED | $A_R$ | $A_G$ | $A_B$ | FUSION ACCURACY | STATISTICAL SIGNIFICANCE† |
|---|---|---|---|---|---|
| STACKING | 0.67 | 0.66 | 0.70 | 0.71 | YES |
| SVM-MV | 0.67 | 0.66 | 0.70 | 0.69 | YES |
| SDP/SVM | GAUSS | GAUSS | GAUSS | 0.66 | YES |
| BSSD | 0.86 | 0.97 | 0.98 | 0.98 | |

TABLE IV: RESULTS FOR THE DATASET III

| METHOD USED | $A_R$ | $A_G$ | $A_B$ | FUSION ACCURACY | STATISTICAL SIGNIFICANCE† |
|---|---|---|---|---|---|
| STACKING | 0.74 | 0.73 | 0.73 | 0.74 | YES |
| SVM-MV | 0.74 | 0.73 | 0.73 | 0.75 | YES |
| SDP/SVM | GAUSS | GAUSS | GAUSS | 0.72 | YES |
| BSSD | 0.72 | 0.78 | 0.73 | 0.85 | |

FIG. 3

TABLE V: RESULTS FOR THE DATASET IV

| METHOD USED | $A_R$ | $A_G$ | $A_B$ | FUSION ACCURACY | STATISTICAL SIGNIFICANCE† |
|---|---|---|---|---|---|
| STACKING | 0.68 | 0.68 | 0.73 | 0.82 | YES |
| SVM-MV | 0.68 | 0.68 | 0.73 | 0.71 | YES |
| SDP/SVM | GAUSS | GAUSS | GAUSS | 0.64 | YES |
| BSSD | 0.87 | 0.85 | 0.96 | 0.98 | |

TABLE VI: RESULTS FOR THE DATASET V

| METHOD USED | $A_R$ | $A_G$ | $A_B$ | FUSION ACCURACY | STATISTICAL SIGNIFICANCE† |
|---|---|---|---|---|---|
| STACKING | 0.72 | 0.62 | 0.83 | 0.88 | YES |
| SVM-MV | 0.72 | 0.62 | 0.83 | 0.79 | YES |
| SDP/SVM | GAUSS | GAUSS | GAUSS | 0.82 | YES |
| BSSD | 0.79 | 0.91 | 0.95 | 0.97 | |

NOISE ROBUSTNESS RESULTS

| DATA SET | NOISE LEVEL | BISD | | | BSSD | | STATISTICAL†1 SIGNIFICANCE |
|---|---|---|---|---|---|---|---|
| | | A GABOR | A RED | FUSION ACCURACY | A GABOR | A RED | FUSION ACCURACY | |
| DATA SET I | 10% | 0.636 | 0.646 | 0.858 | 0.743 | 0.650 | 0.922 | YES |
| | 20% | 0.569 | 0.602 | 0.773 | 0.675 | 0.612 | 0.842 | YES |
| | 30% | 0.543 | 0.562 | 0.689 | 0.656 | 0.575 | 0.773 | YES |
| DATA SET II | 10% | 0.645 | 0.694 | 0.952 | 0.689 | 0.743 | 0.971 | YES |
| | 20% | 0.590 | 0.643 | 0.867 | 0.642 | 0.675 | 0.907 | YES |
| | 30% | 0.558 | 0.590 | 0.771 | 0.624 | 0.613 | 0.837 | YES |
| DATA SET III | 10% | 0.684 | 0.707 | 0.923 | 0.751 | 0.704 | 0.969 | YES |
| | 20% | 0.604 | 0.646 | 0.855 | 0.710 | 0.663 | 0.901 | YES |
| | 30% | 0.552 | 0.587 | 0.751 | 0.621 | 0.601 | 0.782 | COMPARABLE |
| DATA SET IV | 10% | 0.714 | 0.674 | 0.949 | 0.818 | 0.654 | 0.991 | YES |
| | 20% | 0.578 | 0.602 | 0.753 | 0.773 | 0.601 | 0.860 | YES |
| | 30% | 0.559 | 0.566 | 0.682 | 0.720 | 0.565 | 0.753 | YES |
| DATA SET V | 10% | 0.649 | 0.590 | 0.803 | 0.700 | 0.587 | 0.893 | YES |
| | 20% | 0.585 | 0.575 | 0.716 | 0.668 | 0.580 | 0.799 | YES |
| | 30% | 0.557 | 0.537 | 0.625 | 0.626 | 0.542 | 0.700 | YES |

FIG. 6

TABLE I: RESULTS FOR THE DATASET I

| METHOD USED | $A_{FRONT}$ | $A_{LEFT}$ | $A_{RIGHT}$ | FUSION ACCURACY | STATISTICAL SIGNIFICANCE |
|---|---|---|---|---|---|
| SVM-MV | 0.708 | 0.708 | 0.7 | 0.7 | YES |
| STACKED-SVM | 0.708 | 0.708 | 0.7 | 0.717 | YES |
| SDP-SVM | GAUSS | GAUSS | GAUSS | 0.697 | YES |
| SDP-SVM | POLYNOMIAL | GAUSS | GAUSS | 0.697 | YES |
| SDP-SVM | POLYNOMIAL | LINEAR | GAUSS | 0.697 | YES |
| BSSD | 0.62 | 0.62 | 0.56 | 0.76 | |

TABLE II: RESULTS FOR THE DATASET II

| METHOD USED | $A_{FRONT}$ | $A_{LEFT}$ | $A_{RIGHT}$ | FUSION ACCURACY | STATISTICAL SIGNIFICANCE |
|---|---|---|---|---|---|
| SVM-MV | 0.554 | 0.49 | 0.548 | 0.539 | YES |
| STACKED-SVM | 0.554 | 0.49 | 0.548 | 0.578 | YES |
| SDP-SVM | GAUSS | GAUSS | GAUSS | 0.443 | YES |
| SDP-SVM | POLYNOMIAL | GAUSS | GAUSS | 0.45 | YES |
| SDP-SVM | POLYNOMIAL | LINEAR | GAUSS | 0.442 | YES |
| BSSD | 0.632 | 0.537 | 0.577 | 0.864 | |

TABLE III: RESULTS FOR THE DATASET III

| METHOD USED | $A_{EIGENFACE}$ | $A_{EDGE}$ | $A_{WAVELET}$ | FUSION ACCURACY | STATISTICAL SIGNIFICANCE |
|---|---|---|---|---|---|
| SVM-MV | 0.559 | 0.613 | 0.528 | 0.575 | YES |
| STACKED-SVM | 0.559 | 0.613 | 0.528 | 0.67 | YES |
| SDP-SVM | GAUSS | GAUSS | GAUSS | 0.457 | YES |
| SDP-SVM | POLYNOMIAL | GAUSS | GAUSS | 0.439 | YES |
| SDP-SVM | POLYNOMIAL | LINEAR | GAUSS | 0.476 | YES |
| BSSD | 0.591 | 0.593 | 0.545 | 0.74 | |

FIG. 7

NOISE ROBUSTNESS OF BSSD VS SVM-MV FOR FERET DATA SETS

| DATA SET | NOISE 2 VIEWS | SVM-MV | | | | BSSD | | | | STAT. t1 SIGNIF |
|---|---|---|---|---|---|---|---|---|---|---|
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | 0.692 | 0.703 | 0.7 | 0.703 | 0.585 | 0.593 | 0.599 | 0.748 | YES |
| | 20% | 0.704 | 0.695 | 0.7 | 0.709 | 0.574 | 0.543 | 0.615 | 0.745 | YES |
| | 30% | 0.687 | 0.682 | 0.7 | 0.702 | 0.550 | 0.545 | 0.621 | 0.741 | YES |
| FERET DATA SET II | 10% | 0.569 | 0.513 | 0.547 | 0.567 | 0.570 | 0.525 | 0.573 | 0.746 | YES |
| | 20% | 0.540 | 0.531 | 0.548 | 0.580 | 0.538 | 0.516 | 0.573 | 0.687 | YES |
| | 30% | 0.542 | 0.507 | 0.548 | 0.581 | 0.517 | 0.505 | 0.575 | 0.660 | YES |
| FERET DATA SET III | 10% | 0.582 | 0.578 | 0.526 | 0.592 | 0.581 | 0.574 | 0.554 | 0.725 | YES |
| | 20% | 0.559 | 0.584 | 0.528 | 0.578 | 0.573 | 0.570 | 0.550 | 0.702 | YES |
| | 30% | 0.556 | 0.562 | 0.528 | 0.575 | 0.550 | 0.534 | 0.559 | 0.674 | YES |
| DATA SET | NOISE 3 VIEWS | SVM-MV | | | | BSSD | | | | STAT. t1 SIGNIF |
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | 0.692 | 0.703 | 0.697 | 0.702 | 0.597 | 0.601 | 0.576 | 0.743 | YES |
| | 20% | 0.703 | 0.696 | 0.712 | 0.720 | 0.589 | 0.566 | 0.559 | 0.728 | COMPARABLE |
| | 30% | 0.686 | 0.684 | 0.696 | 0.692 | 0.586 | 0.552 | 0.557 | 0.703 | COMPARABLE |
| FERET DATA SET II | 10% | 0.565 | 0.506 | 0.493 | 0.554 | 0.570 | 0.522 | 0.535 | 0.709 | YES |
| | 20% | 0.540 | 0.531 | 0.551 | 0.565 | 0.538 | 0.511 | 0.529 | 0.608 | YES |
| | 30% | 0.542 | 0.507 | 0.546 | 0.568 | 0.516 | 0.505 | 0.517 | 0.540 | COMPARABLE |
| FERET DATA SET III | 10% | 0.583 | 0.578 | 0.544 | 0.604 | 0.573 | 0.575 | 0.547 | 0.726 | YES |
| | 20% | 0.560 | 0.584 | 0.540 | 0.596 | 0.566 | 0.570 | 0.522 | 0.667 | YES |
| | 30% | 0.556 | 0.566 | 0.545 | 0.590 | 0.543 | 0.537 | 0.517 | 0.606 | COMPARABLE |

FIG. 8

NOISE ROBUSTNESS OF BSSD VS STACKING FOR FERET DATA SETS

| DATA SET | NOISE 2 VIEWS | STACKING | | | | BSSD | | | | STAT. †1 SIGNIF |
|---|---|---|---|---|---|---|---|---|---|---|
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | 0.692 | 0.703 | 0.7 | 0.704 | 0.585 | 0.593 | 0.599 | 0.748 | YES |
| | 20% | 0.704 | 0.695 | 0.7 | 0.701 | 0.574 | 0.543 | 0.615 | 0.745 | YES |
| | 30% | 0.687 | 0.682 | 0.7 | 0.683 | 0.550 | 0.545 | 0.621 | 0.741 | YES |
| FERET DATA SET II | 10% | 0.569 | 0.513 | 0.547 | 0.515 | 0.570 | 0.525 | 0.573 | 0.746 | YES |
| | 20% | 0.540 | 0.531 | 0.548 | 0.534 | 0.538 | 0.516 | 0.573 | 0.687 | YES |
| | 30% | 0.542 | 0.507 | 0.548 | 0.526 | 0.517 | 0.505 | 0.575 | 0.660 | YES |
| FERET DATA SET III | 10% | 0.582 | 0.578 | 0.526 | 0.597 | 0.581 | 0.574 | 0.554 | 0.725 | YES |
| | 20% | 0.559 | 0.584 | 0.528 | 0.600 | 0.573 | 0.570 | 0.550 | 0.702 | YES |
| | 30% | 0.556 | 0.562 | 0.528 | 0.567 | 0.550 | 0.534 | 0.559 | 0.674 | YES |
| DATA SET | NOISE 3 VIEWS | STACKING | | | | BSSD | | | | STAT. †1 SIGNIF |
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | 0.692 | 0.703 | 0.697 | 0.705 | 0.597 | 0.601 | 0.576 | 0.743 | YES |
| | 20% | 0.703 | 0.696 | 0.712 | 0.701 | 0.589 | 0.566 | 0.559 | 0.728 | COMPARABLE |
| | 30% | 0.686 | 0.684 | 0.696 | 0.687 | 0.586 | 0.552 | 0.557 | 0.703 | COMPARABLE |
| FERET DATA SET II | 10% | 0.565 | 0.506 | 0.493 | 0.507 | 0.570 | 0.522 | 0.535 | 0.709 | YES |
| | 20% | 0.540 | 0.531 | 0.551 | 0.534 | 0.538 | 0.511 | 0.529 | 0.608 | YES |
| | 30% | 0.542 | 0.507 | 0.546 | 0.518 | 0.516 | 0.505 | 0.517 | 0.540 | COMPARABLE |
| FERET DATA SET III | 10% | 0.583 | 0.578 | 0.544 | 0.592 | 0.573 | 0.575 | 0.547 | 0.726 | YES |
| | 20% | 0.560 | 0.584 | 0.540 | 0.600 | 0.566 | 0.570 | 0.522 | 0.667 | YES |
| | 30% | 0.556 | 0.566 | 0.545 | 0.570 | 0.543 | 0.537 | 0.517 | 0.606 | COMPARABLE |

FIG. 9

NOISE ROBUSTNESS OF BSSD VS SDP/SVM FOR FERET DATA SETS

| DATA SET | NOISE 2 VIEWS | SDP/SVM | | | | BSSD | | | | STAT. †1 SIGNIF |
|---|---|---|---|---|---|---|---|---|---|---|
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | POLY | LINEAR | GAUSS | 0.699 | 0.585 | 0.593 | 0.599 | 0.748 | YES |
| | 20% | POLY | LINEAR | GAUSS | 0.696 | 0.574 | 0.543 | 0.615 | 0.745 | YES |
| | 30% | POLY | LINEAR | GAUSS | 0.699 | 0.550 | 0.545 | 0.621 | 0.741 | YES |
| FERET DATA SET II | 10% | POLY | LINEAR | GAUSS | 0.462 | 0.570 | 0.525 | 0.573 | 0.746 | YES |
| | 20% | POLY | LINEAR | GAUSS | 0.485 | 0.538 | 0.516 | 0.573 | 0.687 | YES |
| | 30% | POLY | LINEAR | GAUSS | 0.459 | 0.517 | 0.505 | 0.575 | 0.660 | YES |
| FERET DATA SET III | 10% | POLY | LINEAR | GAUSS | 0.555 | 0.581 | 0.574 | 0.554 | 0.725 | YES |
| | 20% | POLY | LINEAR | GAUSS | 0.517 | 0.573 | 0.570 | 0.550 | 0.702 | YES |
| | 30% | POLY | LINEAR | GAUSS | 0.517 | 0.550 | 0.534 | 0.559 | 0.674 | YES |
| DATA SET | NOISE 3 VIEWS | SDP/SVM | | | | BSSD | | | | STAT. †1 SIGNIF |
| | | $A_{V_1}$ | $A_{V_2}$ | $A_{V_3}$ | $A_{fus}$ | $A_{V_1}$ | $A_{V_2}$ | $A_{V_3}$ | $A_{fus}$ | |
| FERET DATA SET I | 10% | POLY | LINEAR | GAUSS | 0.698 | 0.597 | 0.601 | 0.576 | 0.743 | YES |
| | 20% | POLY | LINEAR | GAUSS | 0.696 | 0.589 | 0.566 | 0.559 | 0.728 | YES |
| | 30% | POLY | LINEAR | GAUSS | 0.699 | 0.586 | 0.552 | 0.557 | 0.703 | COMPARABLE |
| FERET DATA SET II | 10% | POLY | LINEAR | GAUSS | 0.462 | 0.570 | 0.522 | 0.535 | 0.709 | YES |
| | 20% | POLY | LINEAR | GAUSS | 0.485 | 0.538 | 0.511 | 0.529 | 0.608 | YES |
| | 30% | POLY | LINEAR | GAUSS | 0.459 | 0.516 | 0.505 | 0.517 | 0.540 | YES |
| FERET DATA SET III | 10% | POLY | LINEAR | GAUSS | 0.555 | 0.573 | 0.575 | 0.547 | 0.726 | YES |
| | 20% | POLY | LINEAR | GAUSS | 0.516 | 0.566 | 0.570 | 0.522 | 0.667 | YES |
| | 30% | POLY | LINEAR | GAUSS | 0.517 | 0.543 | 0.537 | 0.517 | 0.606 | YES |

RESULTS FOR THE DATASET I (FERET) - NO NOISE

| METHOD USED | FUSION ACCURACY | STATISTICAL SIGNIFICANCE |
|---|---|---|
| AdaBoost-MV | 0.740 | YES |
| AdaBoost-CONCATENATED | 0.741 | YES |
| BSSD | 0.763 | |

RESULTS FOR THE DATASET I (FERET) - NOISE 30%

| METHOD USED | FUSION ACCURACY | STATISTICAL SIGNIFICANCE |
|---|---|---|
| AdaBoost-MV | 0.675 | YES |
| AdaBoost-CONCATENATED | 0.653 | YES |
| BSSD | 0.703 | |

FIG. 14

RESULTS FOR THE DATASET II (FERET) - NO NOISE

| METHOD USED | FUSION ACCURACY | STATISTICAL SIGNIFICANCE |
|---|---|---|
| AdaBoost-MV | 0.768 | YES |
| AdaBoost-CONCATENATED | 0.840 | YES |
| BSSD | 0.864 | |

RESULTS FOR THE DATASET II (FERET) - NOISE 30%

| METHOD USED | FUSION ACCURACY | STATISTICAL SIGNIFICANCE |
|---|---|---|
| AdaBoost-MV | 0.508 | YES |
| AdaBoost-CONCATENATED | 0.510 | YES |
| BSSD | 0.540 | |

FIG. 15

RESULTS FOR THE DATASET III (FERET) - NO NOISE

| METHOD USED | FUSION ACCURACY | STATISTICAL SIGNIFICANCE |
|---|---|---|
| AdaBoost-MV | 0.712 | YES |
| AdaBoost-CONCATENATED | 0.701 | YES |
| BSSD | 0.740 | |

RESULTS FOR THE DATASET III (FERET) - NOISE 30%

| METHOD USED | FUSION ACCURACY | STATISTICAL SIGNIFICANCE |
|---|---|---|
| AdaBoost-MV | 0.582 | YES |
| AdaBoost-CONCATENATED | 0.580 | YES |
| BSSD | 0.606 | |

FIG. 16

SYSTEM AND METHOD FOR FUSING DATA FROM DIFFERENT INFORMATION SOURCES WITH SHARED-SAMPLING DISTRIBUTION BASED BOOSTING

CROSS-REFERENCE TO RELATED APPLICATIONS

This Application is a non-provisional application under 35 USC 119(e) of provisional application 60/820,527 filed on Jul. 27, 2006, the entire disclosure of which is incorporated herein in its entirety.

TECHNICAL FIELD

The invention is related to information fusion, and more specifically, to boosting-based information fusion methods.

BACKGROUND OF THE INVENTION

A goal of data fusion is to obtain a classifier h such that h learns from all the views available for each training point and has classification accuracy that is better than the case when only one view is available. It is not always possible to separate the classes using information from a single view. However, if information from all the views is combined, a better classification performance may be achieved. Thus, a good fusion algorithm can outperform individual classifiers.

Considerable research in the pattern recognition field is focused on fusion rules that aggregate the outputs of the first level experts and make a final decision, as discussed in J. Kittler, "Combining Classifiers: A Theoretical Framework," Pattern Analysis and Applications, Vol. 1, pp. 18-27, Springer, 1998, and J. Kittler, "A Framework for Classifier Fusion: Is Still Needed?" Lecture Notes in Computer Science, Vol. 1876, pp. 45-56, 2000.

Wolpert describes stacked generalization as a general technique for construction of multi-level learning systems, in Wolpert, D. H., "Stacked generalization", Neural Networks, Vol. 5, pp. 241-259 (1992). In the context of classifier combination, stacked generalization can yield unbiased, full-size training sets for the trainable combiner.

Lanckriet, G. R., et al., "Kernel-based data fusion and its application to protein function prediction in yeast", Proceedings of the Pacific Symposium on Biocomputing, Vol. 9, pages 300-311 (2004) discloses a kernel-based data fusion approach for protein function prediction in yeast that combines multiple kernel representations in an optimal fashion by formulating the problem as a convex optimization problem to be solved using semidefinite programming techniques.

Techniques for fusing expert observations include linear weighted voting, the naïve Bayes classifiers, the kernel function approach, potential functions, decision trees or multi-layer perceptrons. Such techniques are described in J. Kittler, M. Hatef, R. P. W. Duin, and J. Matas, "On Combining Classifiers," IEEE Trans. Pattern Analysis and Machine Intelligence, Vol. 20, pp. 226-239, 1998; L. I. Kuncheva, J. C. Bezdek, and R. P. W. Duin, "Decision Templates for Multiple Classifier Fusion: An Experimental Comparison," Pattern Recognition, Vol. 34, pp. 299-314, 2001; L. Xu, A. Krzyzak, and C. Y. Suen, "Methods of Combining Multiple Experts for the Recognition of Unconstrained Handwritten Numerals," IEEE Trans. Systems, Man, and Cybernetics, Vol. 22, pp. 418-435, 1992; and S. Hashem, "Optimal Linear Combination of Neural Networks," Neural Networks, Vol. 19, pp. 599-614, 1997.

Boosting techniques are intended to improve the prediction accuracy of learning methods, by combining weak classifiers, having poor performance, into a strong classification rule with a better performance. A system known as AdaBoost is described in Y. Freund and R. E. Schapire, "A decision-Theoretic Generalization of On-Line Learning and an Application to Boosting," J. Computer and Systems Science, Vol. 55, pp. 119-139, 1997, and in Y. Freund and R. Schapire, "A short introduction to boosting", Journal of Japanese Society for Artificial Intelligence, 5(14):771 780, September 1999.

BRIEF SUMMARY OF THE INVENTION

One embodiment of the invention is directed to a boosting—based method and system for fusing a set of classifiers that performs classification using weak learners trained on different views of the training data. The final ensemble contains learners that are trained on examples sampled with a shared sampling distribution. The combination weights for the final weighting rule are obtained at each iteration based on the lowest training error among the views. Weights are updated in each iteration based on the lowest training error among all views at that iteration to form the shared sampling distribution used at the next iteration. In each iteration, a weak learner is selected from the pool of weak learners trained on disjoint views based on the lowest training error among all views, resulting in a lower training and generalization error bound of the final hypothesis.

An embodiment of the invention is directed to a robust method for fusing data from different information sources. The method includes initially assigning weights to each of a plurality of training examples, and iteratively for each view: separately training weak classifiers $h_k$ on a sample of training examples based on the distribution of the weights, selecting the weak classifier corresponding to the view with the lowest error rate, and updating the weights of the training examples based on the lowest error rate among all views.

Another embodiment of the invention is directed to a system for fusing data from different information sources. The system comprises an assignment module for initially assigning weights to each of a plurality of training examples; a training module for separately training for each view weak classifiers $h_k$ on a sample of training examples based on the distribution of the weights; a selector that selects a weak classifier at each iteration corresponding to the view with the lowest error rate; and an updater that updates the weights of the training examples based on the lowest error rate among all views. The updated weights of the training examples have the same value for each view in an iteration, and the updated weights for each iteration are based on the lowest error rate among all views of the iteration.

DETAILED DESCRIPTION OF THE INVENTION

Embodiments of the invention are directed to a boosting—based method for fusing a set of classifiers that performs classification using weak learners trained on different views of the training data sampled with a shared sampling distribution. The final ensemble contains learners that are trained to focus on different views of the test data. In each iteration the combination weights for the final weighting rule are obtained using the lowest training error among all views. The shared sampling weights distribution is updated based on the lowest training error among all views at that iteration. In each iteration, a weak learner is selected from the lowest training error view, resulting in a lower training and generalization error bound of the final hypothesis.

Figure 1:
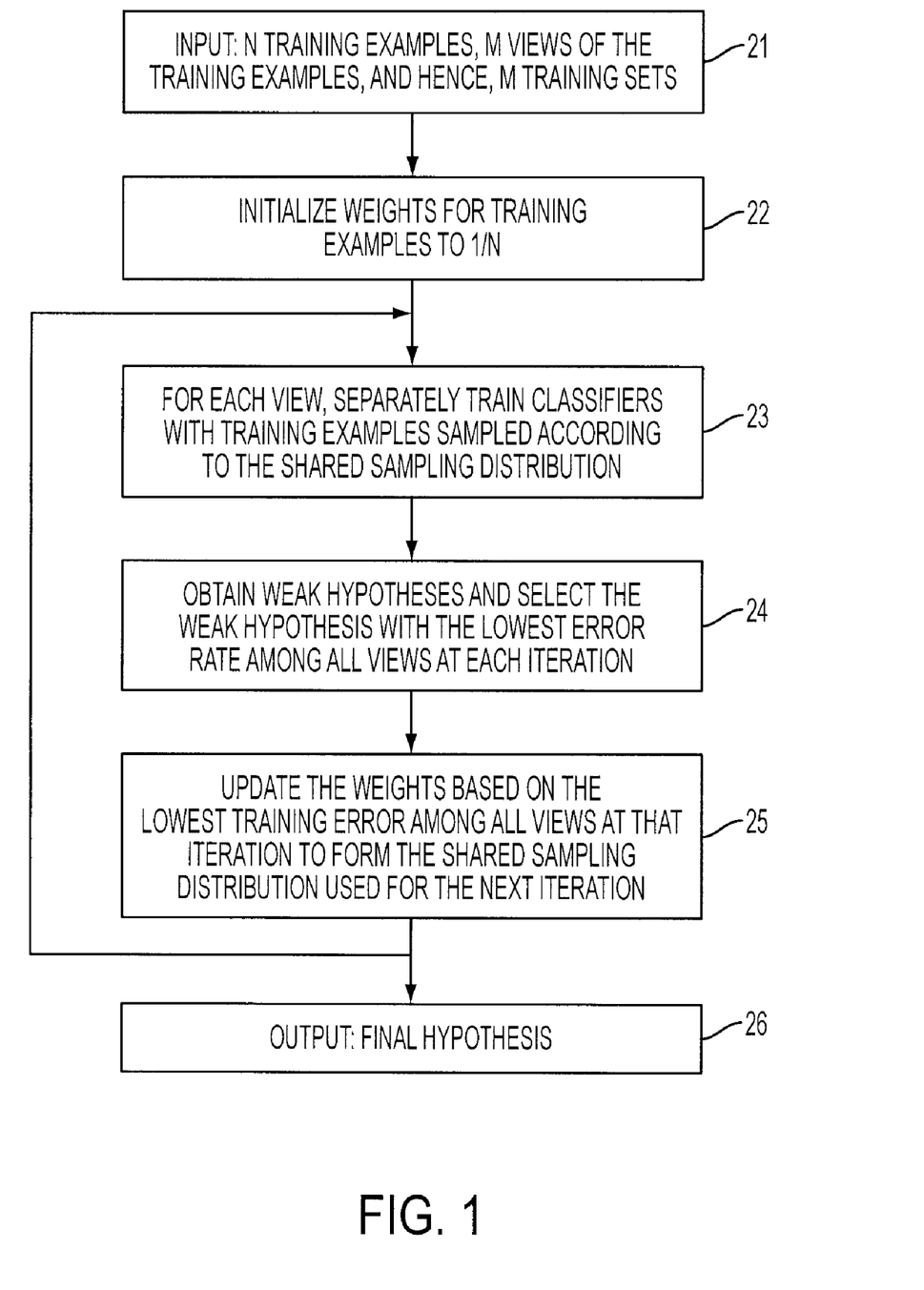
FIG. 1 is an illustration of a method for data fusion in accordance with an embodiment of the invention.

As illustrated in the embodiment of FIG. 1, input 21 includes a training set S of N training points with M disjoint features available for each point. In an initialization step 22, all the views for a given training point are initialized with the same initial weight $w_1(i)=1/N$. Next, for a number of iterations $k=1$ to $k=k_{max}$, the classifiers are separately trained on each view on a sample of training examples based on the shared distribution of the weights 23, weak hypotheses are obtained for each view 24. A training error rate $e^j_k$ is calculated for each view. After a classifier $h_k^*$ with lowest error rate is selected and combination weight $\alpha_k^*$ is obtained, the weights of the training data views are updated 25 forming a shared sampling distribution that will be used to sample training data at the next iteration. A final hypothesis or classifier is output 26 from the system.

Figure 2:
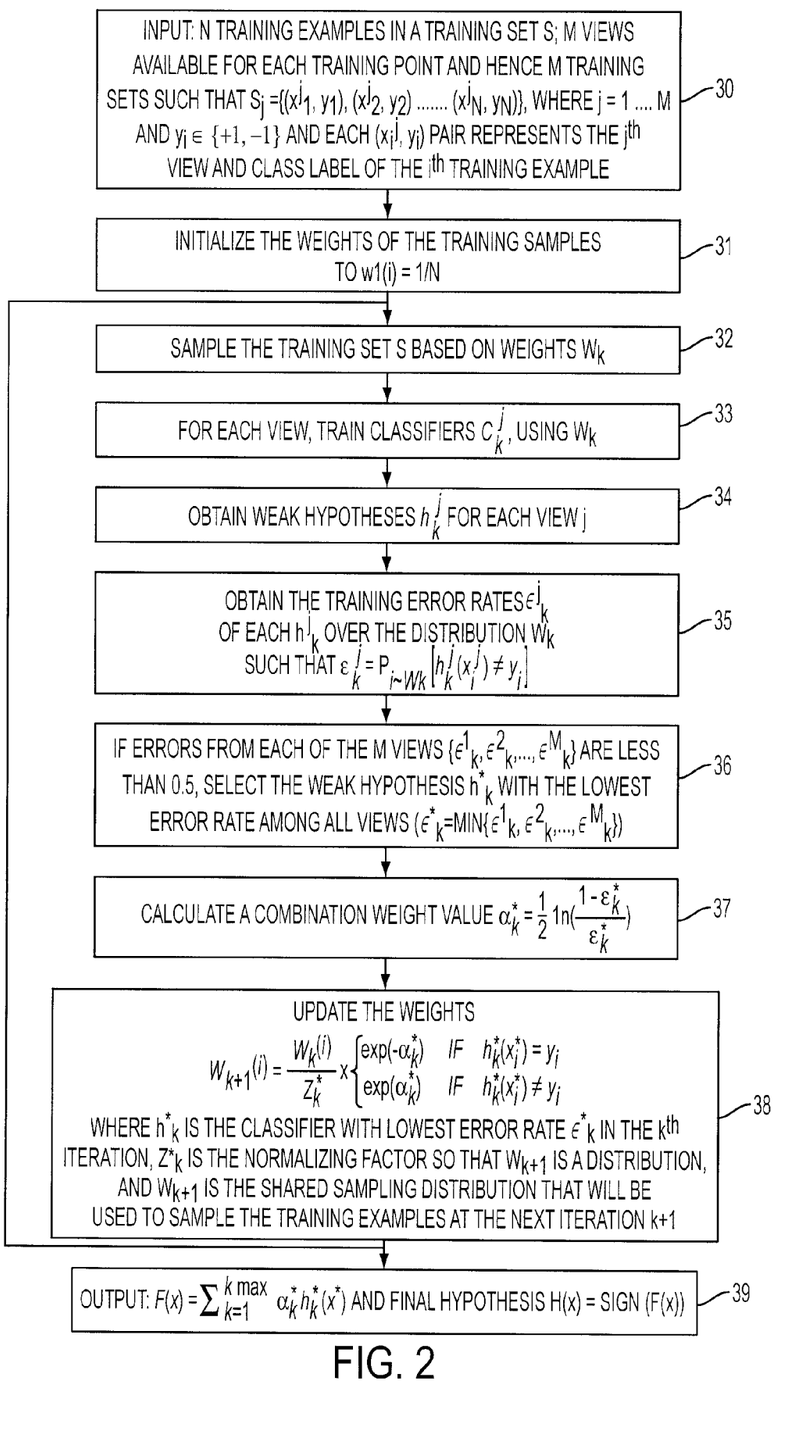
FIG. 2 a more detailed illustration of the method of FIG. 1.

FIG. 2 describes the method of FIG. 1 in greater detail. Input 30 includes a training set S of data of N training points $X=\{x_1, x_2 \ldots x_N\}$. M disjoint features are available for each point $x_i=\{x^1_i, x^2_i \ldots x^M_i\}$. Each member $x^j_i$ in the set $x_i$ is known as a view of point $x_i$. Each $(x^j_i, y_i)$ pair represents the $j^{th}$ view and class label of the $i^{th}$ training example. Since M disjoint features are available for each point, there will be M training sets. The set S is represented as $S_j=\{(x^j_1, y_1), (x^j_2, y_2) \ldots (x^j_N, y_N)\}$, where $j=1 \ldots M$ and $y_i \in \{+1,-1\}$ and each $(x^j_i, y_i)$ pair represents the $j^{th}$ view and class label of the $i^{th}$ training example.

A view may be thought of as a representation of point $x_i$ using disjoint feature sets. For instance, for a color image, each training point $x_i$ may be thought of as a set of three views each consisting of three disjoint features obtained from the intensities of Red, Green and Blue color components. For an example where the three views are Red, Green, and Blue intensities, the views of the point $x_i$ can be represented as $\{x^R_i, x^G_i, x^B_i\}$.

In an initialization step 31, all the views for a given training point $x_i$ are initialized with the same weight $w^j_1(i)=1/N$.

As an example, for three views (red, green, and blue intensities), N training examples each have three disjoint views and a given training example $x_i$ can be represented as $\{x^R_i, x^G_i, x^B_i\}$. The initial weight for each view will be $w^R_i(i)=w^G_i(i)=w^B_i(i)=1/N$.

In a number of iterations from $k=1$ to $k=k_{max}$, the training set is sampled 32 according to the weights of the training points. In the first iteration, the original training set is sampled according to the initially assigned weights. In each iteration, the original training set is sampled according to updated weights of the training points. As the number of iterations progresses, the training points which are difficult to classify from the winning views in previous iterations accumulate high values of sampling weights, so are more likely to be sampled.

In step 33, for each view, the weak classifiers $C^j_k$ are separately trained on training examples sampled based on the weights' distribution. For example, for each view j, train classifiers $h^j_k$ on data sets sampled using weights distribution $W_k$. In the red-green-blue example, for each view j, weak learners $h^R$, $h^G$ and $h^B$ will be trained on the training sets $X^R=\{x^R_1, x^R_2 \ldots, x^R_N\}$, $X^G=\{X^G_1, X^G_2, \ldots, X^G_N\}$, and $X^B=\{x^B_1, x^B_2, \ldots X^B_N\}$, such that $X=\{X^R \cup X^G \cup X^B\}$.

Next, in step 35, obtain the training error rates $\in^j_k$ of each $h^j_k$ over the distribution Wk such that $\epsilon^j_k = P_{i \sim Wk}[h_k^j(x_i^j) \neq y_i]$.

The error rates from the M views at iteration k are $\{\epsilon_k^1, \epsilon_k^2, \ldots, \epsilon_k^M\}$. One of the M views will have the lowest error rate $\in^*_k$ of the views at that iteration, $\epsilon^*_k=\min\{\epsilon_k^1, \epsilon_k^2, \ldots, \epsilon_k^M\}$. If errors from each of the M views $\{\epsilon_k^1, \epsilon_k^2, \ldots, \epsilon_k^M\}$ are less than 0.5, in step 36, select the weak hypothesis $h^*_k$ with the lowest error rate $\in^*_k$ among all views, $\epsilon^*_k=\min\{\epsilon_k^1, \epsilon_k^2, \ldots, \epsilon_k^M\}$.

Next, in step 37, for the lowest error rate $\epsilon^*_k$ at iteration k calculate a combination weight value $\alpha^*_k$ as $$\alpha^*_k = \frac{1}{2}\ln\left(\frac{1-\varepsilon^*_k}{\varepsilon^*_k}\right).$$

In step 38, update weights of the views as $$w_{k+1}(i) = \frac{w_k(i)}{Z^*_k} \times \begin{cases} \exp(-\alpha^*_k) & \text{if } h^*_k(x^*_i) = y_i \\ \exp(\alpha^*_k) & \text{if } h^*_k(x^*_i) \neq y_i \end{cases}$$

where $h^*_k$ is the classifier with lowest error rate $\in^*_k$ in the $k^{th}$ iteration. $Z^*_k$ is the normalizing factor so that $W_{k+1}$ is a distribution. $W_{k+1}$ is the shared sampling distribution that will be used to sample the training examples at the next iteration $k+1$.

Note that since the sampling distribution for all views of a given example is shared, the sampling weight of the R, G and B views of example $x_i$ in iteration k are given by $w^{R,G,B}_k(i)=w^R_k(i)=w^G_k(i)=w^B_k(i)$.

After $k_{max}$ iterations, a decision function F(x) is found as $$F(x) = \sum_{k=1}^{k\max} \alpha^*_k h^*_k(x^*).$$

The resulting hypothesis H(x) is H(x)=sign (F(x)).

This method performs classifier selection based on the lowest training error among the views at each iteration. In each iteration, sampling and weight update is performed using a shared sampling distribution. As a result, the weights for all views of a given training example are updated according to the opinion of the classifier from the lowest error view. In the first few iterations, weak learners from only those views give a good classification accuracy that provide a good separability among the training points. So in the first iteration, a weak learner from that view is likely to be lowest error weak learner that inherently is a more separable view. As the number of iterations progresses, the training points which are difficult to classify from the winning views in previous iterations accumulate high values of sampling weights. Thus, in later iterations, examples will be sampled according to a distribution that is more likely to sample examples that were deemed difficult by previously winning views. A winning classifier is less likely to emerge from the views that were winning views in previous iterations. This results in a cyclic behavior and the classifiers that lose for some iterations eventually have a low weighted error rate and become a winning classifier for a given iteration. This cyclic behavior continues until there is a consensus between the classifiers over which training examples are difficult to classify. In the end, all weak learners from all classifiers agree on what examples are difficult and try to achieve a low error rate. Thus, weak learners trained on individual views in each iteration rectify the bias introduced by learners in preceding iterations resulting in a self-regularizing behavior.

Other embodiments of the invention include devices such as computer systems and computer-readable media having programs or applications to accomplish the exemplary methods described herein.

Other examples of systems that can incorporate these methods are automatic target recognition systems, intelligent electronic navigational systems with in which the features are available from visible range data, infrared sensors data and radar data regarding a specific region of interest.

Another example of a system that can incorporate these methods is a user detection and Recognition system in which the features are biometric, e.g., fingerprints, iris, face, voice data.

Another example of a system that can accomplish these methods is a system for gene function prediction, prediction of protein structure and localization (Bioinformatics). The features can be descriptions of the same data set, each capturing different aspects of the data, such as sequence, expression, protein and regulation information.

Another example application of these methods is a system for skin disease prediction based on texture image analysis (Medical Imaging). The features may be available from the Red, Green and Blue components extracted from the actual color images and/or thermal images etc.

Advantages of the method and system described herein are that the method can have higher accuracy than existing classifier fusion techniques, and better robustness to noise than competing classifier fusion strategies due to the self-regularization mechanism.

The method and system described herein can be used in any situation where features can be extracted from more than one source. This method is particularly useful when the training data is noisy. Robustness under noise is a feature that is essential for any information fusion system due the very nature of different scenarios where such systems are employed. For instance, in a multimodal biometric system it may not be always possible to get the 'perfect fingerprint' of an individual due to dust being accumulated on the sensor or a scar on the finger. The method described herein relies more on other available information sources if one of the information sources is not reliable.

Current data fusion methods, such as Stacking, Majority Vote, Semidefinite programming offer classifier fusion capabilities, but they can be less accurate and less robust to noise. An alternative method (AdaBoost—MV) can be obtained by running boosting separately on each view, obtaining separate ensembles for each view and taking a majority vote among the ensembles when presented with test data. This approach is not very reliable in the presence of noise compared to the method illustrated in FIG. 1 and FIG. 2 and described above. Another approach (AdaBoost Concatenated) is to concatenate the features for all views and to run boosting on the concatenated feature space. However, this method can lead to a degradation of the performance due to the "curse of dimensionality".

The method and system illustrated in FIG. 2 have been evaluated in various scenarios like face detection, gender classification and texture classification. The performance of the algorithm has been compared with other classifier fusion algorithms and its superiority over other fusion techniques has been established on most data sets with >95% confidence using a two-sided paired T-test.

Figure 3:
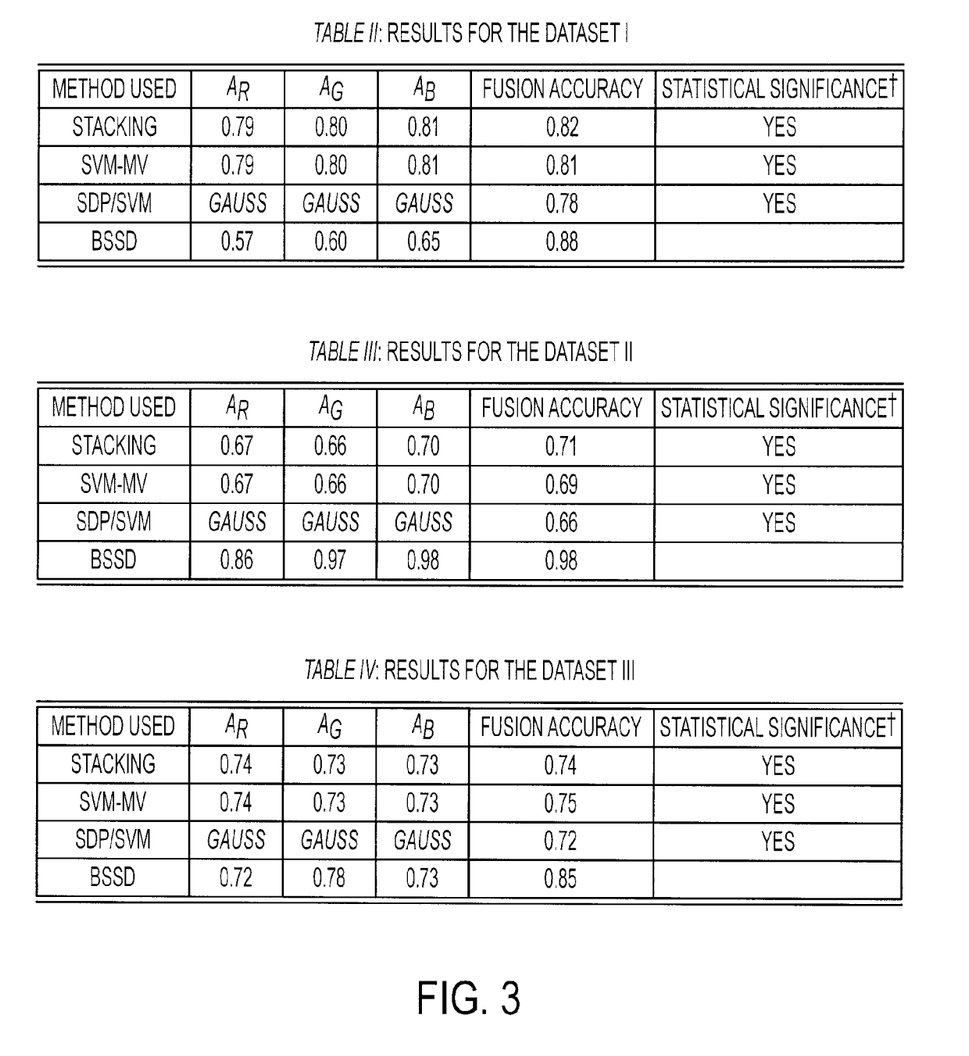
FIGS. 3-5 show experimental results of testing the FIG. 2 BSSD method, a stacked generalization method, a semidefinite programing (SDP/SVM) and a majority vote (SVM-MV) method with five data sets from the MIT VisTex texture database.
Figure 4:
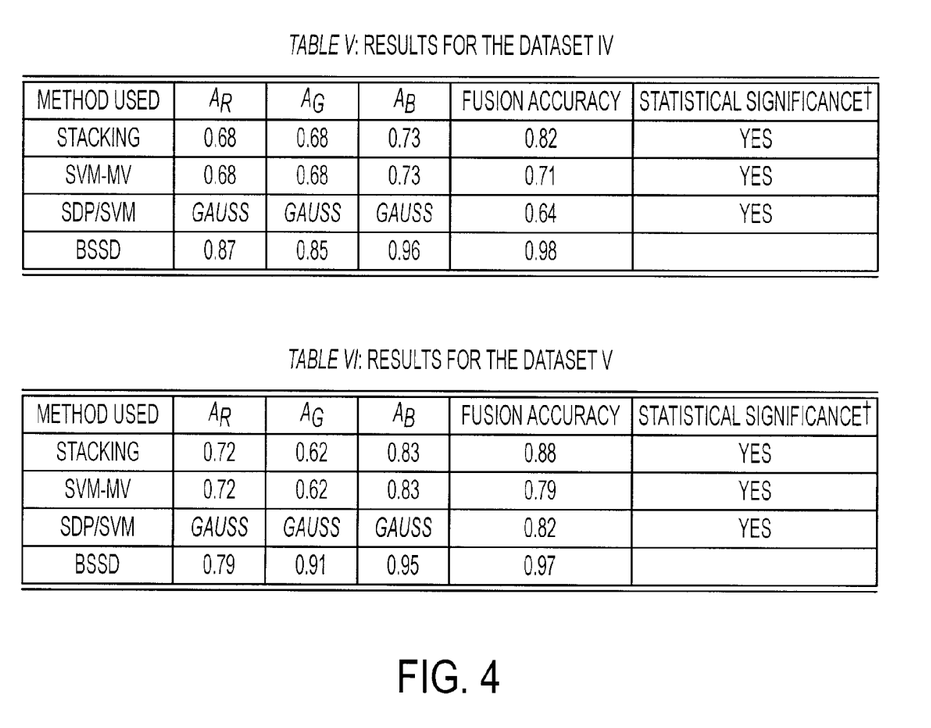
Figure 5:
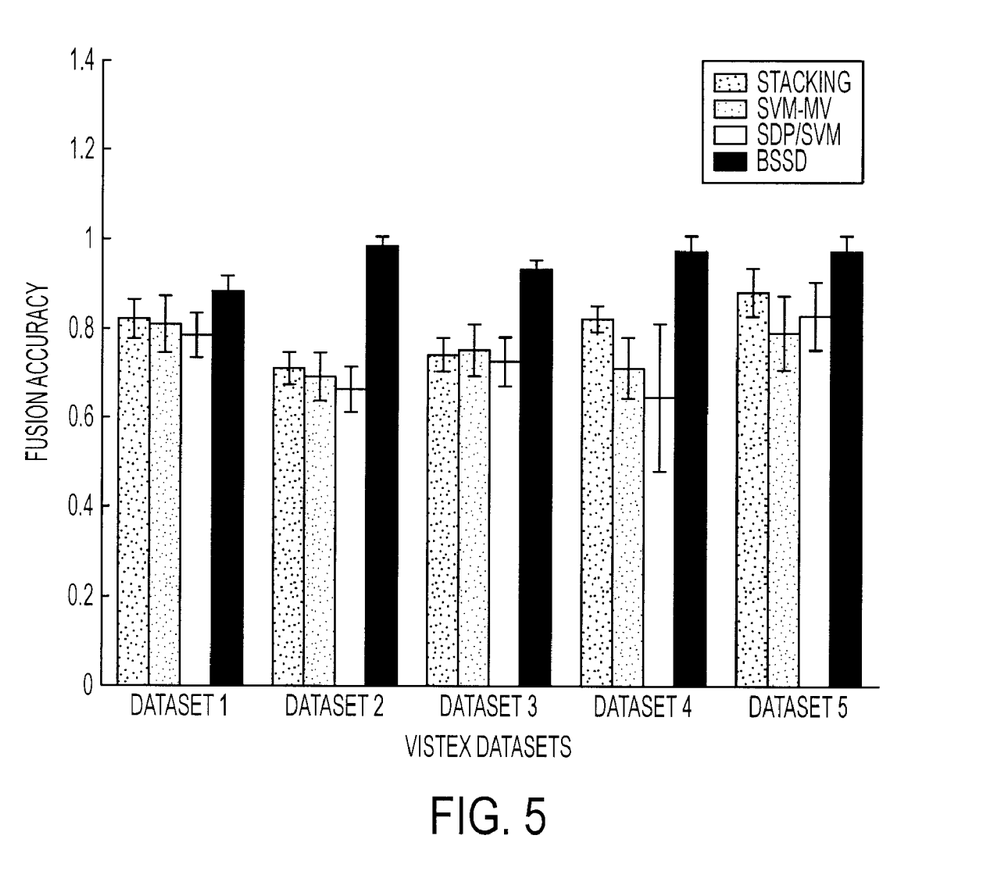

FIGS. 3-5 show experimental results of testing the method of FIG. 3 ("BSSD", or "Boosting with Shared Sampling Distribution") and fusion methods such as stacked generalization (stacking), semidefinite programing (SDP/SVM) and majority vote (SVM-MV) with five data sets from the MIT VisTex texture database. The size and dimensions of the five data sets are shown in the following table.

| Dataset generated from a texture images database | Vector dimensions for each R, G, B | Data set size |
| --- | --- | --- |
| Data set 1 | $D_R = 112, D_G = 113, D_B = 112$ | 144 |
| Data set 2 | $D_R = 84, D_G = 85, D_B = 86$ | 128 |
| Data set 3 | $D_R = 75, D_G = 74, D_B = 75$ | 96 |
| Data set 4 | $D_R = 53, D_G = 54, D_B = 53$ | 64 |
| Data set 5 | $D_R = 50, D_G = 52, D_B = 42$ | 64 |

Three views (Red, Green, and Blue) are the components extracted from each image. Principal Component Analysis is used in order to reduce the dimensionality of the individual components.

The SVM algorithm used as a back-end generalizer in stacking has two procedural parameters: a and C, the soft margin parameter. Ten-fold cross-validation was used for model selection, taking $\sigma$ values in $[10^{-2}, 10^2]$ and C values in $[10^2, 10^2]$. Gaussian, polynomial and linear kernel functions were used on each view for the semidefinite programming technique. Modified C4.5 classifiers or the Naive Bayes classifiers are used as weak learners for boosting.

Results for data sets 1-5 are illustrated in the tables on FIG. 3 and 4. The results are the average accuracy of 20 tests, each time the datasets being randomly partitioned such that 60% of the data is in the training set and the remaining 40% is in the test set. The average accuracy of individual classifier from each view before fusion is shown in the columns $A_R$, $A_G$, and $A_B$, for red, green, and blue, respectively. The average fusion accuracy is presented in column $A_{fusion}$. FIG. 5 summarizes the fusion accuracy results of FIG. 3 and 4 for the five datasets.

Figure 6:
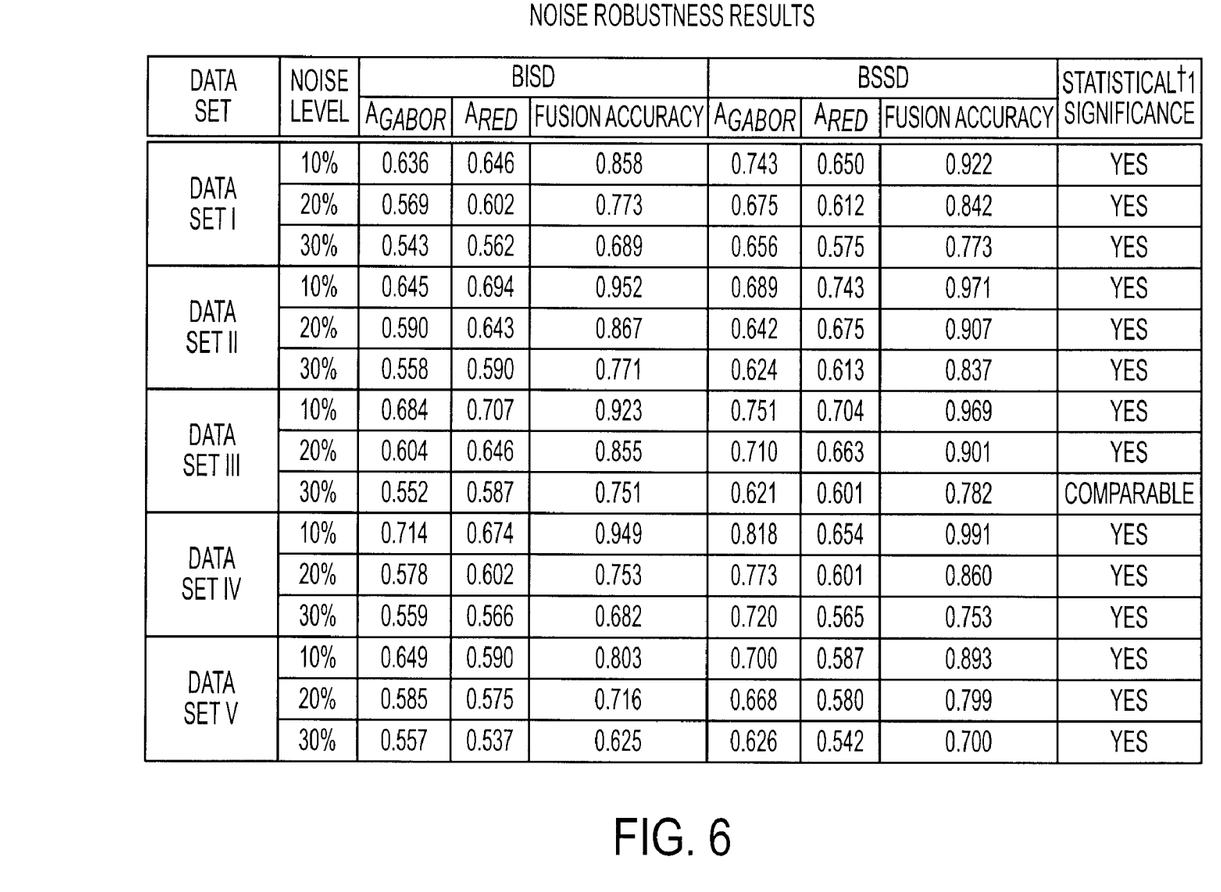
FIG. 6 illustrates the results of comparing the FIG. 2 BSSD method with another embodiment of a boosting method in the presence of noise on MIT VisTex data sets.
Figure 7:
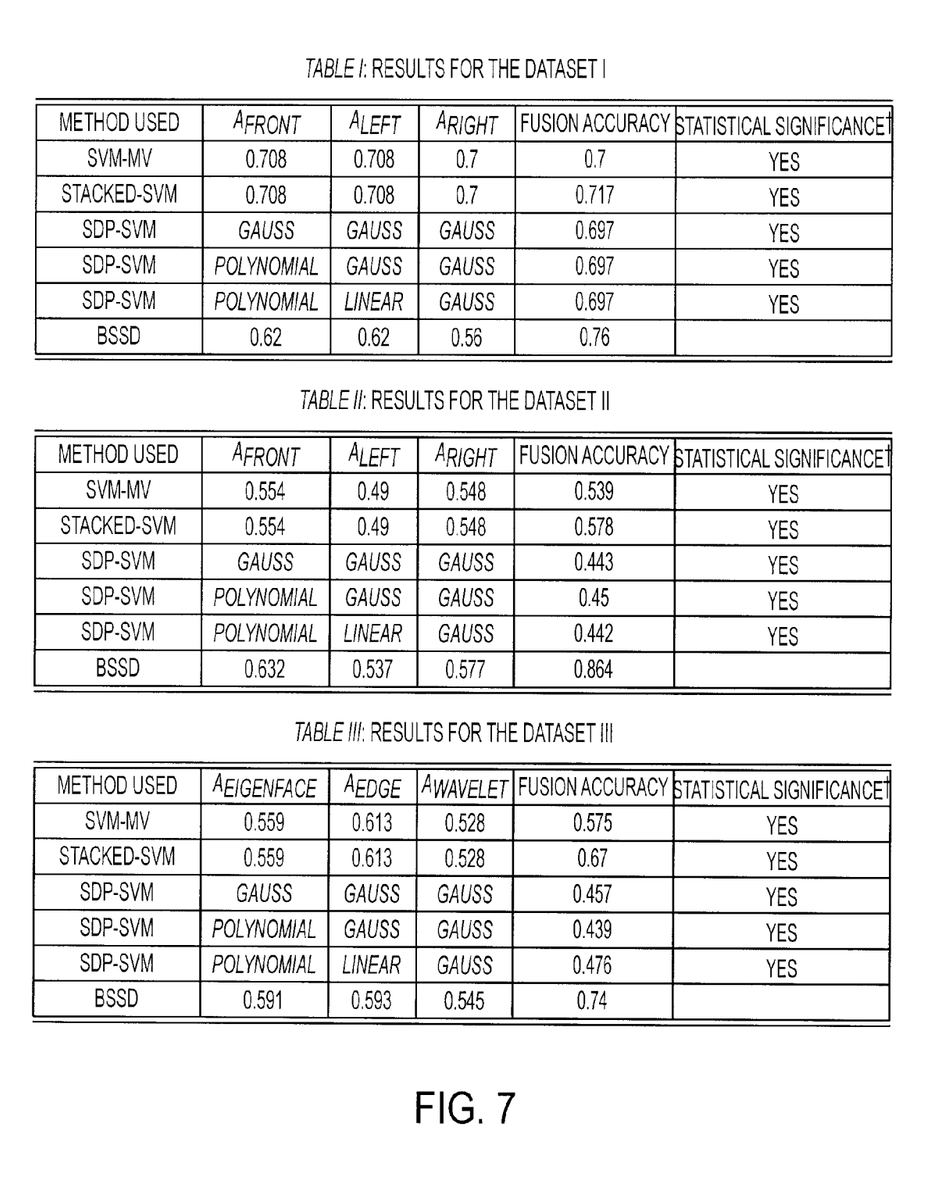
FIGS. 7, 8, 9, and 10 present experimental results for SVM-MV, Stacked—SVM, SDP-SVM, and BSSD methods for three FERET data sets.
Figure 8:
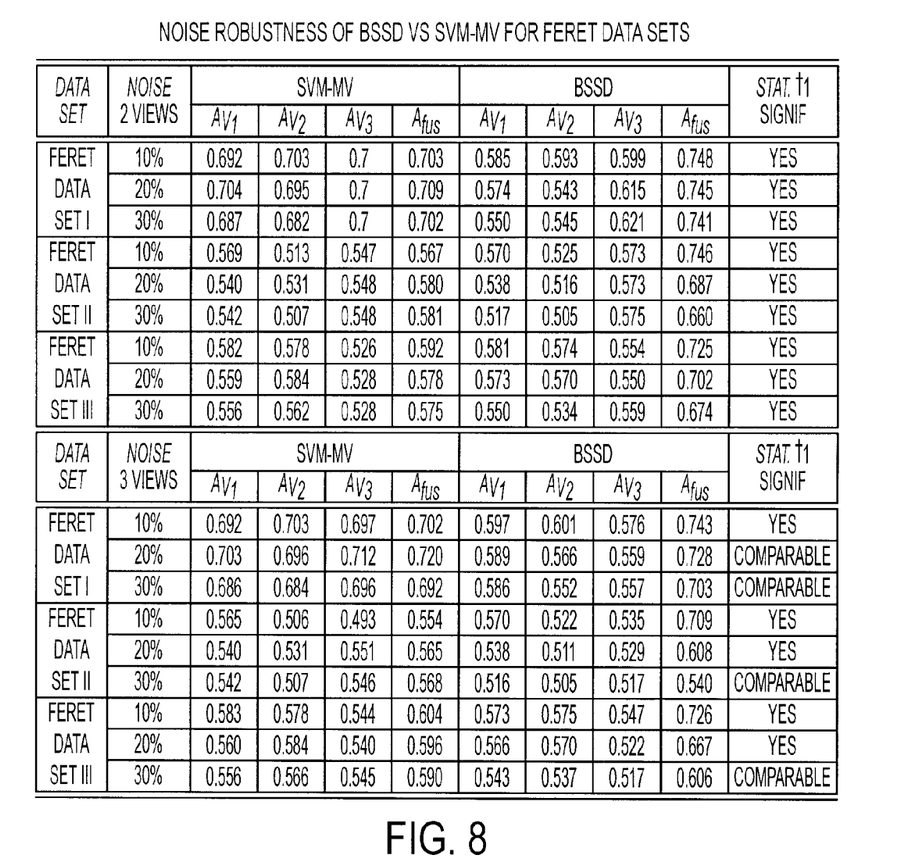
Figure 9:
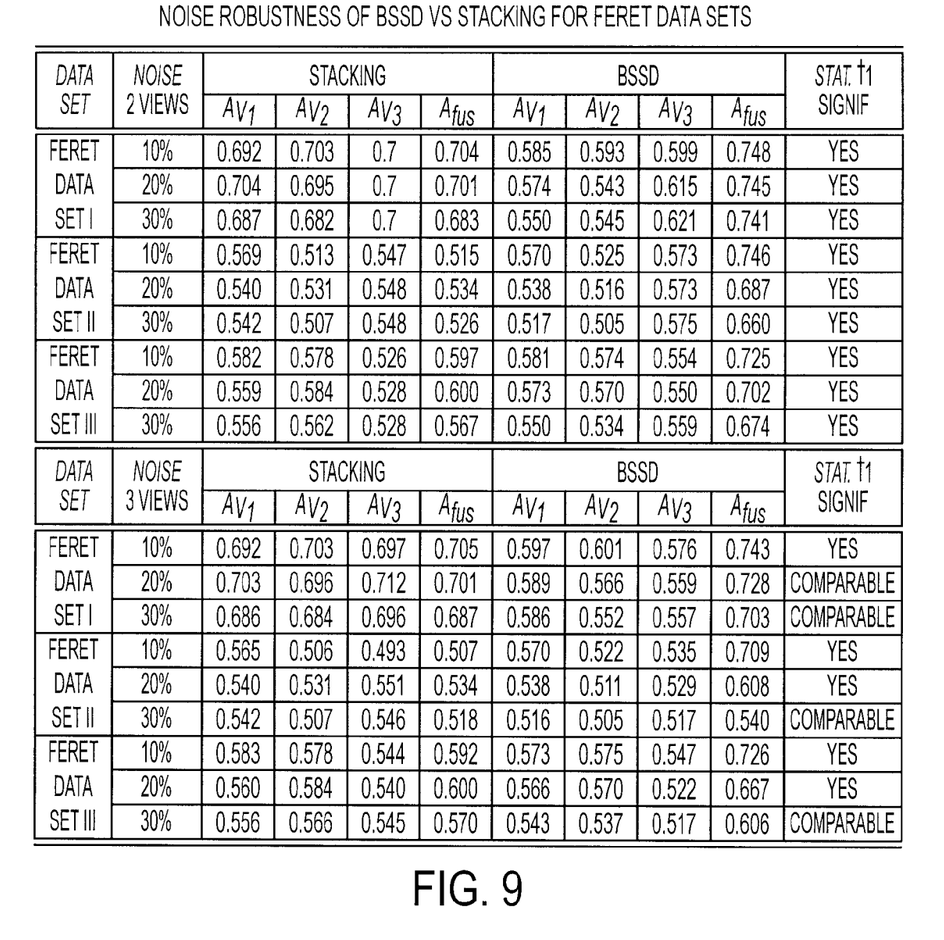
Figure 10:
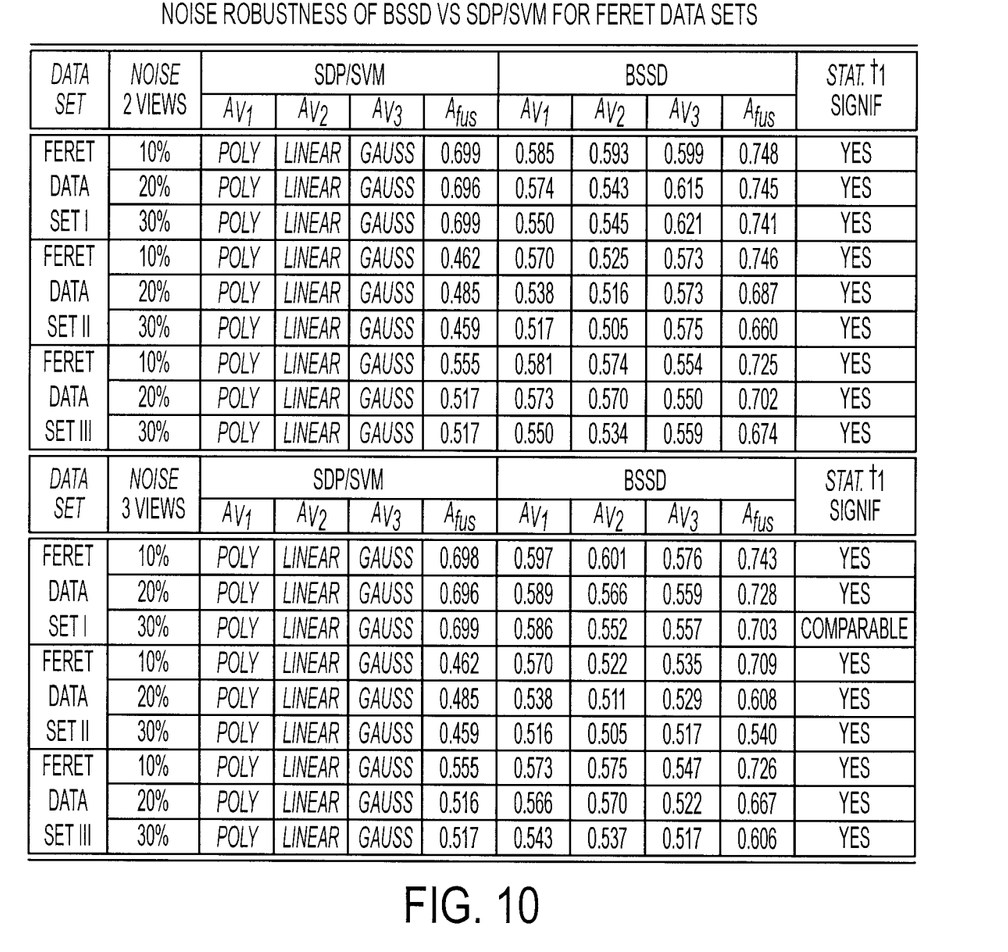
Figure 11:
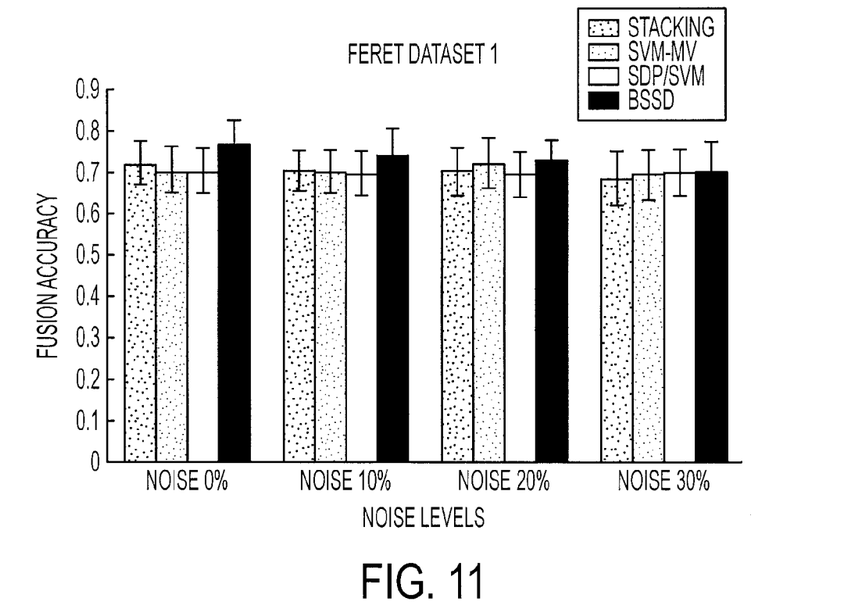
FIGS. 11, 12, and 13 summarize fusion accuracy for three FERET data sets.
Figure 12:
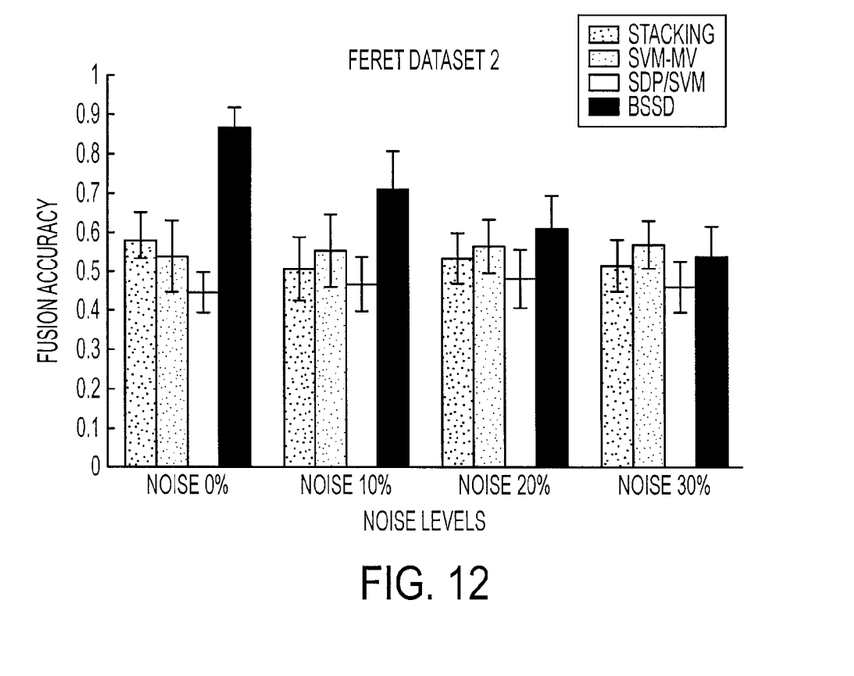
Figure 13:
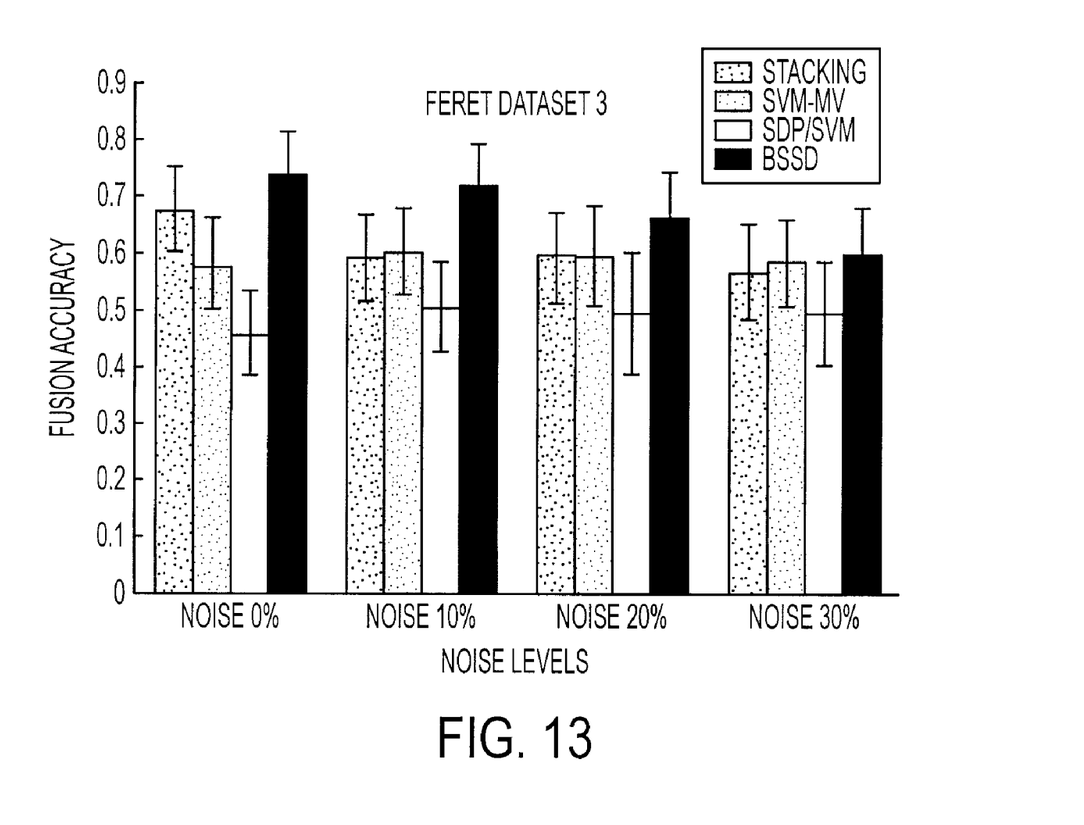

FIG. 6 illustrates the results of comparing the BSSD method of FIG. 2 with another embodiment of a boosting method, in the presence of noise. The alternative embodiment, Boosting with Independent Sampling Distribution (BISD), is different from the FIG. 2 method in that the sampling distributions of the training points are disjoint for each view. As seen in FIG. 6, the BSSD method shows a greater robustness to noise, believed to be due to the self-regularizing aspect of the BSSD method.

FIGS. 7-15 illustrate the results of the BSSD method and other fusion methods. In these tests, the BSSD algorithm is applied to face images from the FERET database to solve three different classification problems (face detection, gender classification and detection of glasses (spectacles) on faces). The first two experiments consider the fusion of three views represented by the eigenfaces extracted from images with three head orientations (poses) of the same person. In the third experiment, the views are obtained by extracting features such as eigenfaces, detected edges and wavelet coefficients for each face image. Each of the data sets had a data set size of 101 vectors with 101 dimensions each (after applying principal component analysis for dimensionality reduction) for each of the three views.

Experimental results are presented in FIGS. 7, 8, 9, and 10 for the following methods: SVM-MV; Stacked—SVM; SDP-SVM; and BSSD. Fusion accuracy for FERET data sets 1, 2, and 3 is summarized in FIGS. 11, 12, and 13.

Figure 14:
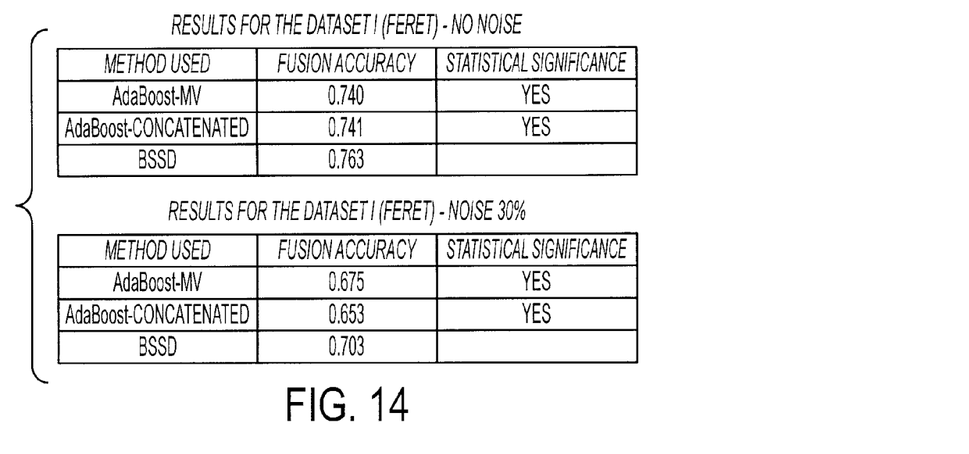
FIGS. 14, 15, and 16 illustrate experimental results of AdaBoost—MV, AdaBoost Concatenated, and BSSD data fusion methods for three FERET data sets.
Figure 15:
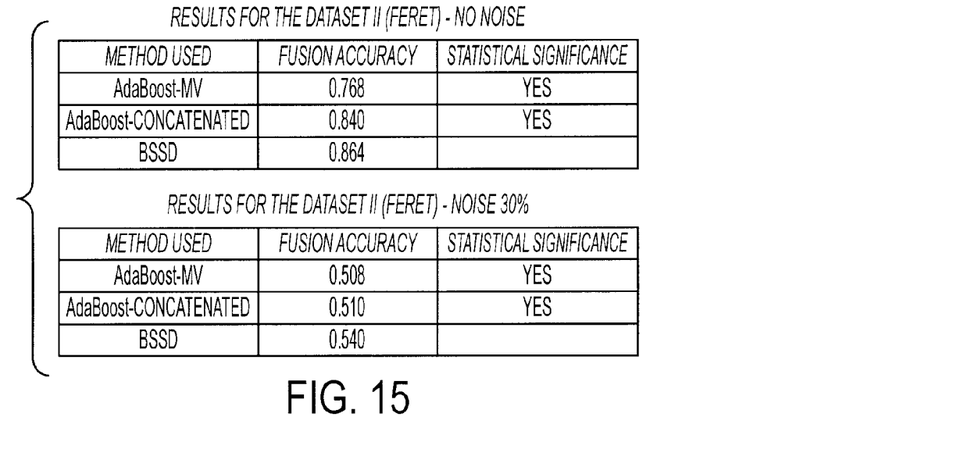
Figure 16:
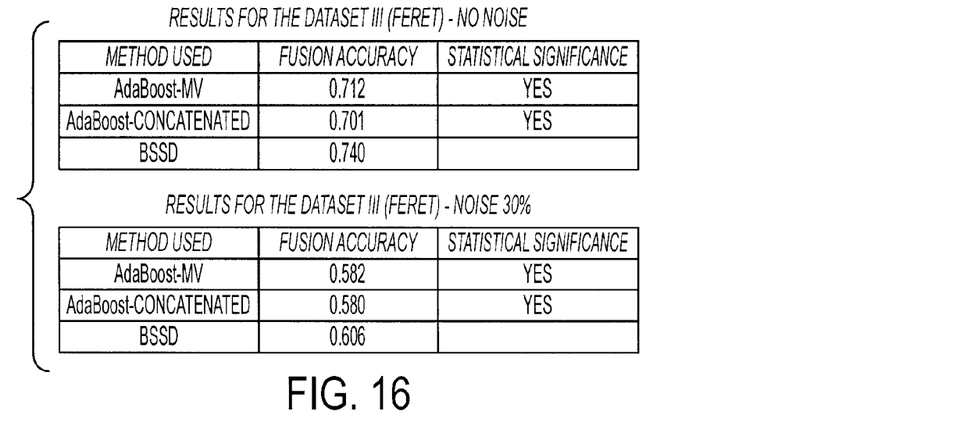

FIGS. 14, 15, and 16 illustrate experimental results of three data fusion methods (AdaBoost—MV; AdaBoost Concatenated; and BSSD) for the three FERET data sets.

The invention has been described with reference to certain preferred embodiments. It will be understood, however, that the invention is not limited to the preferred embodiments discussed above, and that modification and variations are possible within the scope of the appended claims.

The invention claimed is:

1. A computer-implemented robust method for fusing data from different information sources using a training set having a plurality of training examples, each training example having a plurality of disjoint views, the method comprising:
   a) initially assigning weights, by the computer, to each of the plurality of training examples;
   b) sampling the training examples, by the computer, based on the distribution of the weights of the training examples;
   c) iteratively, by the computer, for each of the views, separately training weak classifiers in parallel on the sample of training examples;
   d) selecting, by the computer, the weak classifier corresponding to the view with the lowest training error rate among all the views and calculating a combination weight value associated with the selected classifier as a function of the lowest training error rate at that iteration;
   e) updating the weights of the sampled training examples by, for each of the sampled training examples, assigning the same updated weight for sampling the training examples for all views, the updated weight distribution being a function of-the lowest training error rate among all views at that iteration;
   f) repeating said b) sampling, c) training, d) selecting, and e) updating for a predetermined number of iterations; and
   g) forming a final classifier that is a sum of the selected weak learners weighted by the corresponding combination weight value at each iteration.

2. The method of claim 1, wherein said sampling the training examples includes selecting particular training examples from the training set based on the updated distribution of weights of the training examples at that iteration.

3. The computer-implemented method of claim 1, wherein the initially assigned weight for each training example is 1/N, wherein N is a total number of training examples in the training set.

4. The computer-implemented method of claim 1, wherein said calculating a combination weight value $\alpha_k^*$ for a $k^{th}$ iteration is according to an equation $$\alpha_k^* = \frac{1}{2}\ln\left(\frac{1-\varepsilon_k^*}{\varepsilon_k^*}\right),$$

wherein $\alpha_k^*$ is the combination weight value and $\epsilon_k^*$ is the lowest training error rate among the views in the $k^{th}$ iteration.

5. The computer-implemented method of claim 4, wherein the updated weight is $$w_{k+1}(i) = \frac{w_k(i)}{Z_k^*} \times \begin{cases} \exp(-\alpha_k^*) & \text{if } h_k^*(x_i^*) = y_i \\ \exp(\alpha_k^*) & \text{if } h_k^*(x_i^*) \neq y_i \end{cases},$$

k is an iteration index, i is a training example index, $w_k(i)$ is the weight of the views of the $i^{th}$ training example at the $k^{th}$ iteration, $w_{k+1}(i)$ is the updated weight of $i^{th}$ training example, $Z_k^*$ is a normalization factor, $h_k^*(x_i^*)$ is the weak classifier with the lowest training error rate at the $k^{th}$ iteration and $y_i$ is a class label of the $i^{th}$ training example.

6. The computer-implemented method of claim 4, further comprising:
   producing a final classifier for fusing data from different information sources according to an equation $$F(x) = \sum_{k=1}^{k\max} \alpha_k^* h_k^*(x^*)$$

on the computer, wherein $F(x)$ is the final classifier, $h_k^*(x^*)$ is the weak classifier with the lowest training error rate at the $k^{th}$ iteration, and $k_{max}$ is the predetermined number of iterations.

7. The computer-implemented method of claim 1, wherein the information sources include at least two sensors operating at different frequencies.

8. The computer-implemented method of claim 1, wherein the information sources and training examples include at least two of visible range data, infrared sensors data and radar data.

9. The computer-implemented method of claim 1, wherein the views are different color intensities extracted from an image data set.

10. The computer-implemented method of claim 1, wherein the disjoint views are from a same data set, each view capturing a different aspect of the data.

11. Computer readable media having computer readable instructions recorded thereon for fusing data from different information sources using a training set having a plurality of training examples, each training example having a plurality of disjoint views, said data from different information sources and said training examples being data from at least one sensor, the computer readable media comprising:
   an assignment module including instructions for initially assigning weights to each of a plurality of training examples;
   a training module including instructions for sampling the training examples based on the distribution of the weights of the training examples and, iteratively for each view, separately training weak classifiers in parallel on the sample of training examples;
   a selector including instructions for selecting a weak classifier at that iteration corresponding to the view with the lowest training error rate among all the views and calculating a combination weight value associated with the selected classifier as a function of the lowest training error rate at that iteration;

an updater including instructions for assigning the weights for all views of that training example with the same updated weight for sampling the training example, the updated weight distribution being a function of the lowest training error rate among all views at that iteration;

wherein the training module, the selector, and the updater repeat said sampling, said training, said selecting, and said updating for a predetermined number of iterations; and instructions for forming a final classifier that is a sum of the selected weak classifiers weighted by the corresponding combination weight value at each iteration.

12. The computer readable media according to claim 11, wherein the computer readable media is a component of an automatic target recognition system or an intelligent electronic navigation system.

13. The computer readable media according to claim 11, wherein the information source is at least one of visible range data, infrared sensors data, or radar data.

14. The computer readable media of claim 11, wherein the computer readable media outputs the final classifier that is an ensemble of the selected weak learners corresponding to those views with the lowest training error at each iteration.

15. The computer readable media of claim 11, wherein the initially assigned weight for each training example is 1/N, wherein N is a total number of training examples in the training set.

16. The computer readable media of claim 11, wherein said combination weight value $\alpha_k^*$ is calculated according to an equation $$\alpha_k^* = \frac{1}{2}\ln\left(\frac{1-\varepsilon_k^*}{\varepsilon_k^*}\right),$$

wherein k is an iteration index, $\alpha_k^*$ is the combination weight value and $\varepsilon_k^*$ is the lowest training error rate among the views in a $k^{th}$ iteration 17. The computer readable media of claim 16, wherein the updated weight value is $$w_{k+1}(i) = \frac{w_k(i)}{Z_k^*} \times \begin{cases} \exp(-\alpha_k^*) & \text{if } h_k^*(x_i^*) = y_i \\ \exp(\alpha_k^*) & \text{if } h_k^*(x_i^*) \neq y_i \end{cases},$$

wherein i is a training example index, $w_k(i)$ is the weight of the views of the $i^{th}$ training example at the $k^{th}$ iteration, $w_{k+1}(i)$ is the updated weight of $i^{th}$ training example, $Z_k^*$ is a normalization factor, $h_k^*(x_i^*)$ is the weak classifier with the lowest training error rate at the kth iteration and $y_i$ is the class label of the $i^{th}$ training example.

18. The computer readable media according to claim 17, wherein the final classifier is found according to an equation $$F(x) = \sum_{k=1}^{k\max} \alpha_k^* h_k^*(x^*),$$

wherein F(x) is the final classifier, and $k_{max}$ is the predetermined number of iterations.

\* \* \* \* \*